(12) United States Patent
Aguera-Arcas

(10) Patent No.: US 10,157,324 B2
(45) Date of Patent: Dec. 18, 2018

(54) SYSTEMS AND METHODS OF UPDATING USER IDENTIFIERS IN AN IMAGE-SHARING ENVIRONMENT

(71) Applicant: Google Inc., Mountain View, CA (US)

(72) Inventor: Blaise Aguera-Arcas, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/535,074

(22) PCT Filed: May 10, 2016

(86) PCT No.: PCT/US2016/031578
§ 371 (c)(1),
(2) Date: Jun. 12, 2017

(87) PCT Pub. No.: WO2016/183047
PCT Pub. Date: Nov. 17, 2016

(65) Prior Publication Data
US 2018/0005062 A1 Jan. 4, 2018

Related U.S. Application Data

(60) Provisional application No. 62/159,747, filed on May 11, 2015.

(51) Int. Cl.
*G06K 9/00* (2006.01)
*G06F 21/62* (2013.01)
(Continued)

(52) U.S. Cl.
CPC ..... *G06K 9/00993* (2013.01); *G06F 21/6245* (2013.01); *G06F 21/6254* (2013.01);
(Continued)

(58) Field of Classification Search
CPC .......... G06K 9/00993; G06K 9/00221; G06K 9/00677; G06K 9/00926; G06K 9/00979; G06F 21/6245; G06F 21/6254
See application file for complete search history.

(56) References Cited

U.S. PATENT DOCUMENTS 8,560,625 B1 * 10/2013 Hardman ........... G06K 9/00677
709/206
8,918,087 B1 * 12/2014 Paczkowski ...... H04M 1/72572
345/419

(Continued)

FOREIGN PATENT DOCUMENTS

WO    WO 2014/200678    12/2014

OTHER PUBLICATIONS

International Search Report for PCT/US2016/031578, dated Nov. 14, 2016, 3 pages.

*Primary Examiner* — David F Dunphy
(74) *Attorney, Agent, or Firm* — Dority & Manning, PA

(57) ABSTRACT

Computer-implemented methods and systems of updating user identifiers in an image-sharing environment include features for facilitating blocking, permitting, sharing and/or modifying content such as images and videos. User identification vectors providing data representative of a user and information about one or more facial characteristics of the user are broadcasted by a modular computing device. Information about one or more additional characteristics of the user (e.g., body characteristics and/or contextual characteristics) as determined from images of the user obtained by one or more image capture devices are received. An updated user identification vector including the information about one or more additional characteristics of the user is stored at and subsequently broadcasted by the modular computing device.

20 Claims, 3 Drawing Sheets

(51) Int. Cl.
  *G06K 9/20* (2006.01)
  *G06T 11/60* (2006.01)
(52) U.S. Cl.
  CPC ..... *G06K 9/00221* (2013.01); *G06K 9/00677* (2013.01); *G06K 9/00926* (2013.01); *G06K 9/00979* (2013.01); *G06K 9/00255* (2013.01); *G06K 9/00288* (2013.01); *G06K 9/00335* (2013.01); *G06K 9/00362* (2013.01); *G06K 9/209* (2013.01); *G06K 2209/27* (2013.01); *G06T 11/60* (2013.01)

(56) References Cited

U.S. PATENT DOCUMENTS

| | | | |
|---|---|---|---|
| 2004/0263631 A1* | 12/2004 | Brittan | H04M 1/72555 348/207.1 |
| 2006/0028558 A1 | 2/2006 | Sato et al. | |
| 2006/0251292 A1 | 11/2006 | Gokturk et al. | |
| 2012/0076354 A1* | 3/2012 | Price | G06K 9/00 382/103 |
| 2012/0250951 A1 | 10/2012 | Chen | |
| 2013/0095855 A1* | 4/2013 | Bort | G06T 17/05 455/456.2 |
| 2013/0275505 A1* | 10/2013 | Gauglitz | G06Q 30/06 709/204 |
| 2014/0032596 A1* | 1/2014 | Fish | G06F 17/30867 707/770 |
| 2014/0162234 A1* | 6/2014 | Ukelson | G09B 5/065 434/308 |
| 2014/0244744 A1* | 8/2014 | Lyren | G06Q 50/01 709/204 |
| 2014/0250175 A1* | 9/2014 | Baldwin | G06K 9/00677 709/204 |
| 2014/0350840 A1* | 11/2014 | D'Argenio | G01S 5/0284 701/409 |
| 2016/0217217 A1* | 7/2016 | Boudville | G06F 17/30879 |

* cited by examiner

SYSTEMS AND METHODS OF UPDATING USER IDENTIFIERS IN AN IMAGE-SHARING ENVIRONMENT

FIELD

The present disclosure relates generally to utilizing user identifiers within an image-sharing environment, and more particularly to updating user identifiers stored by modular computing devices associated with a user so as to block, permit and/or modify image collection by image capture devices.

BACKGROUND

A plethora of known computing devices are currently available for providing mobile image capture and sharing via a networked communication environment. Such computing devices include conventional cameras, video cameras, and mobile devices including smartphones, smart watches, tablets, laptops and other devices that include one or more integrated image sensors. Even wearable computing devices, such as life recorders can contain cameras worn around a user's neck and configured to take pictures of events and other data that occur during a user's course of daily action. Images captured with these devices can occur upon prompted instruction by a user, automatically on a fixed periodic schedule, or upon the sensed occurrence of detected events.

Regardless of how images are captured in an environment, a subsequent desire often exists to share those images with others. Image sharing can be done via a number of conventional communication networks such as a local area network (e.g. intranet), wide area network (e.g. Internet), cellular network, or other image-sharing environment. Prolific opportunities for image collection as well as image sharing results in a need to address potential privacy concerns of individuals that may be present in the images. Some individuals may desire to have access to images in which they are a subject, while others may desire to block or modify images in which they are a subject.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of updating user identifiers in an image-sharing environment. The method can include broadcasting, by at least one modular computing device, a user identification vector providing data representative of a user and information about one or more facial characteristics of the user. The method can also include receiving, by the at least one modular computing device, information about one or more additional characteristics of the user. The information about one or more additional characteristics of the user can be determined from images of the user obtained by the one or more image capture devices. The method can still further include storing, by the at least one modular computing device, an updated user identification vector including the information about one or more additional characteristics of the user, and broadcasting, by the at least one modular computing device, the updated user identification vector.

Other example aspects of the present disclosure are directed to systems, apparatus, tangible, non-transitory computer-readable media, user interfaces, memory devices, and electronic devices for updating user identifiers in an image-sharing environment.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
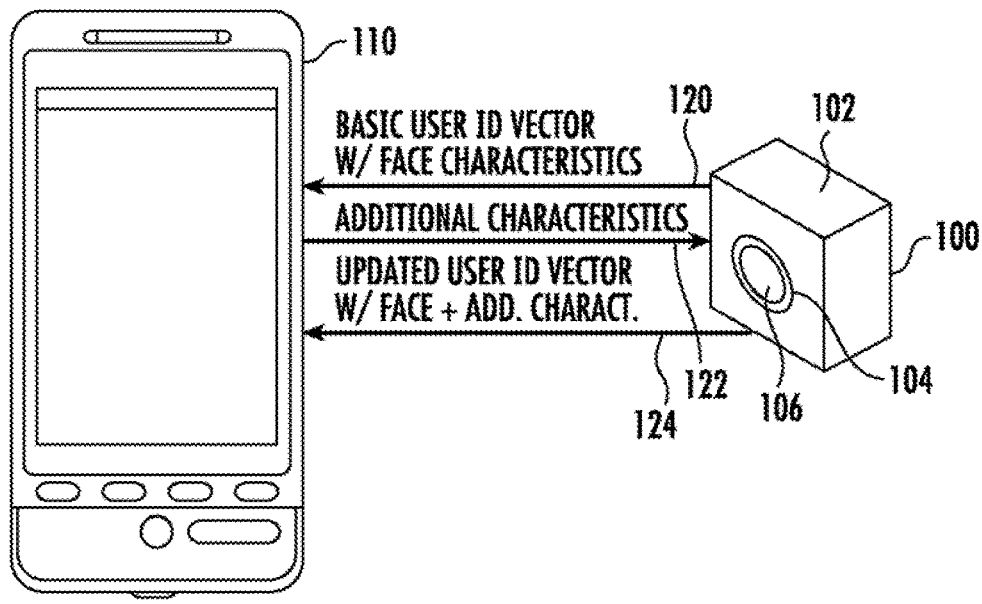
FIG. 1 depicts a modular computing device and an image capture device in communication according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods of updating user identifiers in an image-sharing environment. Within an environment of image collection and sharing, there can be an increased probability that someone may take photos or videos of someone else who does not want to be photographed. People having their photo or video taken may also desire to have access to the obtained images in order to view or later block or modify the images.

The disclosed systems and methods of updating user identifiers can provide instructive features for facilitating blocking, permitting, sharing and/or modifying content such as images and videos. Such features can be especially beneficial in environments using modular computing devices embodying social, wearable cameras that automatically capture images for people. The disclosed features can advantageously coordinate selective blocking or permission of obtained images, and also can accurately detect individuals whose images are included in captured content. Additional features can help manage communication among modular devices and image capture devices, and ultimately process images in accordance with different user preferences.

In general, the disclosed systems and methods of updating user identifiers include employing a modular computing device to broadcast user identification vectors providing data representative of a user and information about one or more facial characteristics of the user. Information about one or more additional characteristics of the user (e.g., body characteristics and/or contextual characteristics) as determined from images of the user obtained by one or more image capture devices are received. An updated user identification vector including the information about one or more additional characteristics of the user is stored at and subsequently broadcasted by the modular computing device. The modular computing device may also be an image capture device and vice versa. In some examples, the modular computing device is configured for functional operation in a position relative to the body of the user and the image capture device communicated with by the modular computing device corresponds to a smartphone, smart watch, a laptop, a tablet or another modular computing device.

In more particular examples, the one or more additional characteristics of the user include body characteristic data defining one or more of the current clothing and/or accessories worn by the user, or current body shape, body size or hair color or style characteristics. In other examples, the one or more additional characteristics of a user include contextual characteristics defining the context of an image including a user, such as the current time, location, companions, nearby landmarks, or the like. In still further examples, the one or more additional characteristics of a user include information classifying the emotional state of a user or other people in an image (e.g., does this photo show "joy," "sorrow," "laughter" or the like). When an image capture device in proximity to the modular computing device receives the broadcasted user identification vector, the image capture device may then share one or more obtained images including the user with the modular computing device. Additionally or alternatively, a user identification vector can include a privacy request for the user indicating that the user would like to block collection of images that include the user. In this latter instance, portions of the one or more images corresponding to the user can be modified in response to the privacy request.

In some embodiments, in order to obtain the benefits of the techniques described herein, the user may be required to allow the collection and analysis of information collected by modular devices. For example, in some embodiments, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable or other information is removed.

Referring now to FIGS. 1-6, various specific aspects of example systems and methods for broadcasting and updating user identifiers as well as related coordination of handling images within an image-sharing environment are depicted. With more particular reference to FIG. 1, one or more modular computing devices 100 are provided to gather information within the surrounding environment of a user. Each modular computing device 100 can include a housing 102, at least one sensor opening 104 and at least one attachment element (not shown). Each sensor opening 104 is configured to provide an opening within the housing 102 for containing a sensor, such as an image sensor 106 as shown in FIG. 1. Additional description of such sensors as well as additional internal hardware and/or software components within each modular computing device 100 is presented later with reference to FIG. 2. One or more attachment elements provided as part of modular computing device 100 can include features that enable the modular computing device to be configured for functional operation in a position relative to the body of a user. For example, an attachment strap (e.g., a strap of varied length made out of string, metal, leather, or other material) can be provided to create a wearable device to be worn around a user's neck, wrist, finger, head, chest or other location relative to the body of a user.

The provision of an image sensor 106 within modular computing device 100 enables the modular computing device 100 to function as an image capture device for obtaining images including photographic images or video image sequences. In some environments, collections of modular computing devices 100 can be provided that accommodate increased opportunities for image collection. For example, different people within a group can each wear a modular computing device at a specific event (e.g., a concert) or a specific place (e.g., an amusement park) in order to capture images for remembering and sharing notable events. In another example, a collection of modular computing devices can be placed within a particular environment (e.g., within a home) to capture images for a special occasion like a family gathering. In some environments, additional image capture devices 110 can be provided as an additional or alternative device for capturing images. Image capture device 110 can be a camera, mobile device, smartphone, tablet, laptop, wearable computing device or the like that is provided with one or more image sensors for capturing images and one or more communication modules for sharing images and related communication information with other devices in an environment.

When image capture devices are used in an image collection and sharing environment, it should be appreciated that some people in the environment may wish to designate particular privacy limitations relative to the collection and sharing of such images. For example, a user may prefer to be blocked from any obtained images or may desire that they have access to any images of them that are obtained by devices in the area. In other examples, a user could indicate that they only authorize a subset of people or devices to obtain images of them. Regardless of the particular user preferences, various disclosed features are presented for broadcasting information that will assist with the ultimate implementation of those preferences.

Referring still to FIG. 1, modular computing device 100 can be worn by a user as a wearable device such as a ring or necklace and image capture device 110 can be employed by another individual to obtain images in an area nearby to the user wearing modular computing device 100. Modular computing device 100 can be configured to broadcast a basic user identification vector 120. Basic user identification vector 120 includes basic data representative of a user to which the modular computing device 100 is assigned or programmed to represent. Basic user identification vector 100 can more particularly include information about one or more facial characteristics of the user, referred to herein as face embeddings. Face embeddings can be an identification vector corresponding to a short string of alphanumeric characters (e.g., a string of numbers having some predetermined length) that provide data about what a user looks like in a compressed form. In some examples, data representative of a user broadcasted at 120 can additionally or alternatively include one or more images of a user's face. However, identification vectors can be useful in low power communication applications, such as when modular computing device is a low power device or a passive device (e.g., one without an active transmitter module, but that reflects its broadcast information when interrogated by another device.)

In one non-limiting example, face embeddings provided within the basic user identification vector 120 can be generated based on learning a Euclidean embedding per image using a deep convolutional network. Such a face embedding network can be trained such that squared L2 distances in the embedding space directly correspond to face similarity. In other words, faces of the same person have small distances and faces of distinct people have large distances. Once this embedding has been produced, face verification simply involves thresholding the distance between two embeddings.

Basic user identification vector 120 may start with face embeddings, with the option of initially or later including additional information (e.g., information defining one or more body characteristics of a user). Information including body characteristics (with or without additional face characteristics) are referred to herein as person embeddings. User identification vectors disclosed herein often include at least face embeddings because these are durable over long time periods, meaning that they are unaffected by factors such as but not limited to user pose, haircuts, makeup, hats, environmental lighting and the like. Person embedding, on the other hand, may not reliably track a person from day to day (since it is often dominated by user clothes). However, person embedding can have powerful invariance over the timescale of an event, and be able to identify individuals from behind and from farther away than if only a face embedding was employed in user identification. Utilization of both face embeddings and person embeddings can help image capture devices collectively catalog all visible faces and all visible bodies and match them up.

Basic user identification vector 120 can also include a permission indicator within the broadcasted data. In one example, the permission indicator corresponds to one character in the string that is programmed to include one of a variety of permission states. One example permission state corresponds to a "block" state, which is a privacy request indicating that the user assigned to modular computing device 120 desires to be blocked from any images captured or potentially captured of the user. Another example permission state corresponds to an "allow" state indicating that the user allows the capture of images that include the user. Allow states can be full or partial, with partial allowance being defined in terms of authorized parties, places, times or other selective image capture limitations. The permission indications included within basic user identification vector 120 provide instructions on how image capture device 110 or other image capture devices are authorized to proceed with captured images containing the user associated with modular computing device 100.

Permission states can be defined within a user identification vector to accomplish a variety of customizable interaction among individuals and proximate image capture devices. For example, user identification vectors can be customized at a particular event where collective photography is implemented such that people taking part in an image swarm can get back photos including themselves. Unidentified people (i.e., one without a modular computing device or assigned user identification vector) not involved in the image swarm can be blocked by default, meaning that photos of the unidentified people will not appear in the collective photography.

The disclosed technology can also be employed to characterize a previously unidentified person, by adding identification to an existing device. For instance, a guest who is not himself taking photos can be photographed by an event host or device participant using a cooperating device and assigned a user identification vector based on facial characteristics identified from the captured image. If that guest desires to allow himself as a subject in images and/or be a photo recipient who subsequently receives obtained images or links to such images, then the permission state within the guest's user identification vector can be set accordingly to an allow/share state. If the guest desires to be blocked from captured images, then the permission state within the guest's user identification vector can be set to a block state. The host device or other modular computing device can then be configured to broadcast a user identification vector for the host as well as any optional guests that are identified using the host device.

Devices that receive basic user identification vector 120 can compare images (or data defining people identified within images) with the basic user identification vector 120 to identify images that include the user associated with modular computing device 100. If the images are identified as including an image portion corresponding to the user, then action can be taken relative to the images in accordance with the permission state defined by user identification vector 120. For example, if user identification vector 120 indicates that a user desires to be blocked, then images containing the blacklisted user can be modified to remove or distort the portion of the image containing the user. In another example, if user identification vector 120 indicates that a user allows image capture and desires to obtain images of them that are captured, then modular computing device 100 can receive communicated information from other image capture devices including images or links to images that are identified as including the user. As such, permission indicators provided within user identification vector can be useful for both privacy and sharing applications.

The identification of particular people within images at an image capture device (e.g., device 110) can be useful not only for determining how to implement a permission state, but also in helping to update the user identification vector. When basic user identification vector 120 includes only a face embedding, then information about additional characteristics of the user can be identified from captured images at image capture device 110 and transmitted back to modular computing device 100 via signal 122. In some examples, additional characteristics signal 122 can include information about additional body characteristics of the user, including data identifying one or more of a user's clothes, hair, accessories such as hats, scarves, jewelry, purses and the like, body features such as estimated height or estimated size/shape characteristics, as well as any number of additional data features.

In other examples, signal 122 can additionally or alternatively include contextual characteristics of a user. Contextual characteristics can include information such as other individuals that the user is with (e.g., other people identified in photos of the user). Contextual characteristics can also include information classifying the emotional state of a user or other people in an image (e.g., does this photo show "joy," "sorrow," "laughter" or the like). Contextual information can also include geographic information such as the location at time of capture or sharing of an image. Geographic information can correspond to specific latitude/longitude or other coordinates that might be available in an image geotag. Geographic information can also be coarsened if desired to identify broader geographic information such as a block identifier, neighborhood identifier, zip code, city, country, continent or the like associated with image capture or sharing. Contextual information within signal 122 can also include additional geo-connectable features identified within obtained images that can assist with landmark recognition and general location matching across multiple obtained images. Contextual information can also include specific dates and times of image capture and/or sharing.

The additional information received by signal 122 can then be added to the basic user identification data including the original face embedding. In this way, future beacons broadcast from modular computing device 100 correspond to updated user identification vector 124. Updated user identification vector 124 can include face embedding information as well as body embedding, person embedding, and/or context embedding information. This will enhance subsequent recognition of the user associated with modular computing device 100 at a distance or from behind by other image capture devices that receive updated user identification vector 124.

Figure 2:
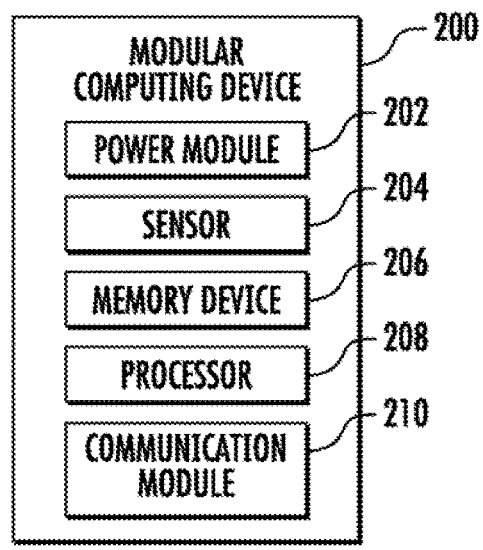
FIG. 2 provides an example overview of system components for a modular computing device according to example aspects of the present disclosure.

Referring now to FIG. 2, a schematic overview of example system components that may be included within one or more modular computing devices in accordance with the disclosed technology is depicted. More particularly, a modular computing device 200 can include at least one power module 202, at least one sensor 204, at least one memory device 206, at least one processor 208 and at least one communications module 210. In some examples, a modular computing device 200 in accordance with the disclosed technology can be a special purpose electronic device that includes a limited subset of components that can operate with electronic efficiency in a generally compact structure. In other examples, modular computing device 200 can correspond to an existing device such as a smartphone, laptop, tablet, wearable computing device or the like that includes dedicated components such as those illustrated in FIG. 2 that are used for the specific purposes disclosed herein.

Power module 202 can include any type of energy storage device such as a battery or capacitive device, which may optionally be rechargeable. In some examples, power module 202 can include a passive energy source such as one that is capable of rectifying energy received from an interrogating RF field or electromagnetic field in order to power the other circuitry within modular computing device 200.

One or more sensors 204 also may be provided within modular computing device 200. Although multiple sensors may be provided within some examples of a modular computing device 200, other examples limit the number of sensors per modular computing device. Particular examples of helpful sensors include one or more image sensors such as a camera and one or more audio sensors such as a microphone.

In some examples, a first sensor 204 corresponding to a camera and a second sensor 204 corresponding to a microphone will be configured to work together to facilitate selective image and audio capture for the disclosed embodiments. In some examples, a microphone 204 can be used to identify instances when audio signals are present in the vicinity of the modular computing device 200 at or above a predetermined threshold decibel level. In other examples, a microphone 204 can be used to identify when audio signals are present that include one or more predetermined sound features such as laughter. In such instances, identification of laughter in audio signals can increase the likelihood that an image sensor included within modular computing device 200 will capture images at that time. Detection of certain audio features such as laughter could also automatically trigger the capture of audio signals. In other examples, audio capture is only initiated upon manual selection or triggering by a user. The capture of audio signals can be subject to the same privacy measures disclosed herein for image capture, including but not limited to the use of user identification vectors to block/allow capture of audio clips and the like.

Data captured by the one or more sensors 204 as well as other information within the modular computing device 200, including the user identification vectors 120 and 124 can be stored within one or more memory devices 206. The one or more memory devices 206 can include one or more computer-readable media, including, but not limited to, tangible, non-transitory, computer-readable media, RAM, ROM, hard drives, flash memory, or other memory devices. In some examples, memory devices 206 can correspond to coordinated databases that are split over multiple locations or modular computing devices.

The one or more memory devices 206 can also store information accessible by the one or more processors 208 including instructions that can be executed by the one or more processors 208. The one or more processor(s) 208 can include any suitable processing device, such as a microprocessor, microcontroller, integrated circuit, logic device, one or more central processing units (CPUs) and/or other processing devices. The one or more memory devices 206 can also include data that can be retrieved, manipulated, created, or stored by the one or more processors 208.

Instructions stored within the one or more memory devices 206 can help implement any of the computer-implemented methods disclosed herein. Instructions can also be stored within memory devices 206 that help implement smart operation of the one or more sensors 204 such that sensors only obtain data when a predetermined event is observed at the modular computing device. For example, pictures are only obtained via one or more image sensors when movement is detected near the modular computing device.

Modular computing device 200 also can include one or more communications modules 210 to facilitate communication from the modular computing device 200 to another modular computing device, a cooperating image capture device, a remote computing device, a home computing device associated with a particular user, or a network over which communication with such devices or other devices can occur. In some examples, communication module 210 includes a light source such as an infrared (IR) or Light Emitting Diode (LED) configured to provide a strobed lighting output for coordinated communication with other modular computing devices. In other examples, communications module 210 can include a network interface used to communicate with other computing devices over a short range communications network via one or more communication technologies such as but not limited to Wi-Fi, Bluetooth, Zigbee, NFC or other electromagnetic induction technologies. In still further examples, communications module 210 may include a network interface for connecting to other types of communications networks such as a local area network (e.g. intranet), wide area network (e.g. Internet), cellular network, or some combination thereof. Such network interface(s) can include any suitable components for interfacing with one more networks, including for example, transmitters, receivers, ports, controllers, antennas, or other suitable components.

Although FIG. 2 illustrates one example of the types of electronic components that might be included within a modular computing device 200, it should be appreciated that other examples might adapt an existing computing device to perform the desired functionality of a modular computing device as disclosed. For example, the memory within an existing computing device such as a mobile device, smartphone, tablet, laptop, wearable computing device or the like could be programmed with instructions that cause the existing computing device to perform the computer-implemented methods disclosed herein for use with a modular computing device. This might be particularly helpful for adapting existing mobile devices such as cellular phones and the like that already include the basic components 202-210 of a modular computing device such as sensors (phone camera, microphone and/or speaker) as well as basic battery, memory, processor and communication modules.

Figure 3:
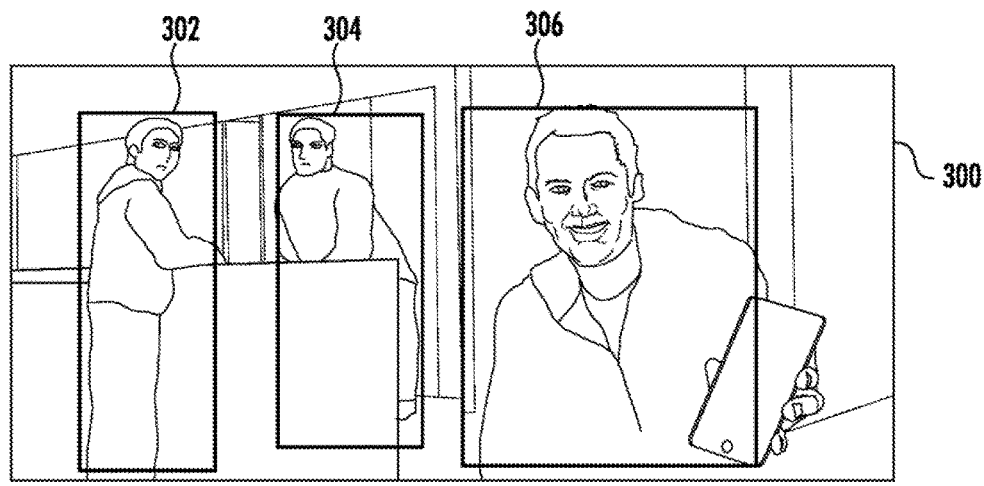
FIG. 3 depicts a first example image before modification according to example aspects of the present disclosure.
Figure 4:
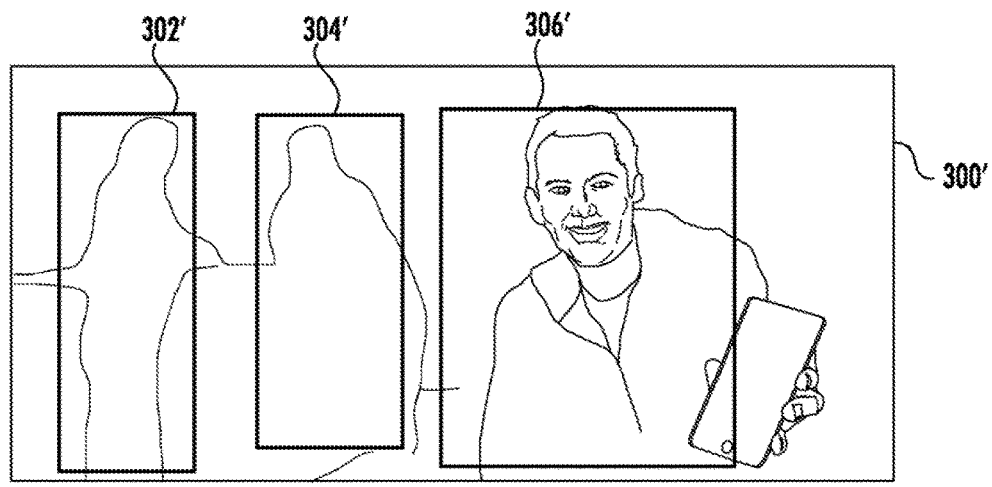
FIG. 4 depicts the first example image of FIG. 3 after modification according to example aspects of the present disclosure.
Figure 5:
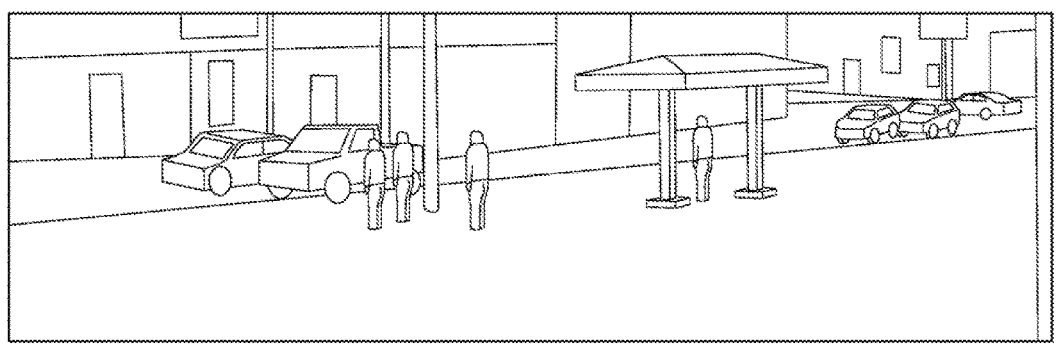
FIG. 5 depicts a second example image obtained in accordance with example aspects of the present disclosure.

Referring now to FIGS. 3-5, additional aspects of image modification are depicted as examples of action steps taken when a user identification vector includes a privacy request indicating that the user would like to block collection of images that include the user. For example, an image 300 can be identified as including three individuals, corresponding to the image portions 302, 304, and 306 respectively. Although image portions 302, 304, and 306 are illustrated in FIG. 3 as encompassing the entire bodies of the individuals, it should be appreciated that other examples identify individuals according to just a portion of their body such as their faces. As such, image portions 302, 304, and 306 may actually be much smaller for purposes of individual identification.

Image portions 302, 304, and 306 are analyzed to determine whether image 300 includes any individuals who may be broadcasting a user identification vector in accordance with the disclosed examples. If matches are found within image 300 (e.g., by matching face and/or body embeddings within a locally broadcasted user identification vector with image portions 302-306), and one or more of the locally broadcasted user identification vectors includes a privacy request, then additional steps can be taken by the device that captured image 300 to modify the image. In some examples, this matching identification can be done in real-time such that image capture viewfinders that are preparing to capture an image can overlay an indication within the sensed view of people who are allowing image capture and/or people who are blocking image capture. If image 300 was the real-time view being displayed in a camera viewfinder, this identification could be done via an augmented reality display that provides a highlighted overlay or colored outline around selective people identified at image portions 302, 304, and 306, providing permission state indications to an image capture device user. Indications could also be provided in a real-time augmented reality display to inform an image capture device user whether nearby people would like to receive shared images in which they are subjects.

FIG. 4 depicts an example modification to image 300 that can be implemented when individuals 302 and 304 both transmit a user identification vector including a privacy request. The image portions 302 and 304 can be modified to distort image 300 so that the individuals within image portions 302 and 304 are unrecognizable. FIG. 4 shows one example of a modified image 400 that is created by blurring other portions of the image outside of image portion 306. Since the individual within original image portion 306 is the only user allowed in a picture according to locally broadcasted user identification vectors, blurring the area within image 400 that is outside image portion 306' has the effect of blurring out the individuals previously located at image portions 302' and 304'. Alternative techniques could blur or otherwise modify just image portions 302 and 304 so that new image portions 302' and 304' include more localized image blur.

One example technique for modifying image 300 to create modified image 400 includes a near field capture technique that simulates image capture using a narrow depth of field for an image capture device. This near field capture technique has the effect of artistically blurring bystanders in an image. This can be accomplished using stereo reconstruction via Structure From Motion (SFM) technology. This facilitates computational constraints on an image capture device to only capture nearby (high-parallax) content, thus heavily blurring the background. This can be a useful modification technique for object capture or for capturing a single person in a crowded environment.

Another example technique for modifying an image in order to effectively block users that send privacy requests in a user identification vector is to use place-only image capture techniques. An example of an image captured using place-only techniques is depicted in FIG. 5. This technique is useful for capturing an environment without any of the people in it. This can be accomplished by using SFM and geometry reconstruction to mask out anything that moves relative to a captured environment, filling in occluded material from other frames that sampled the same spot. This technique can be used to create people-less images, videos or interactive environments. Person recognition and additional image modification can be used to augment this technique when images include people that have little to no movement during a sampled time space.

Figure 6:
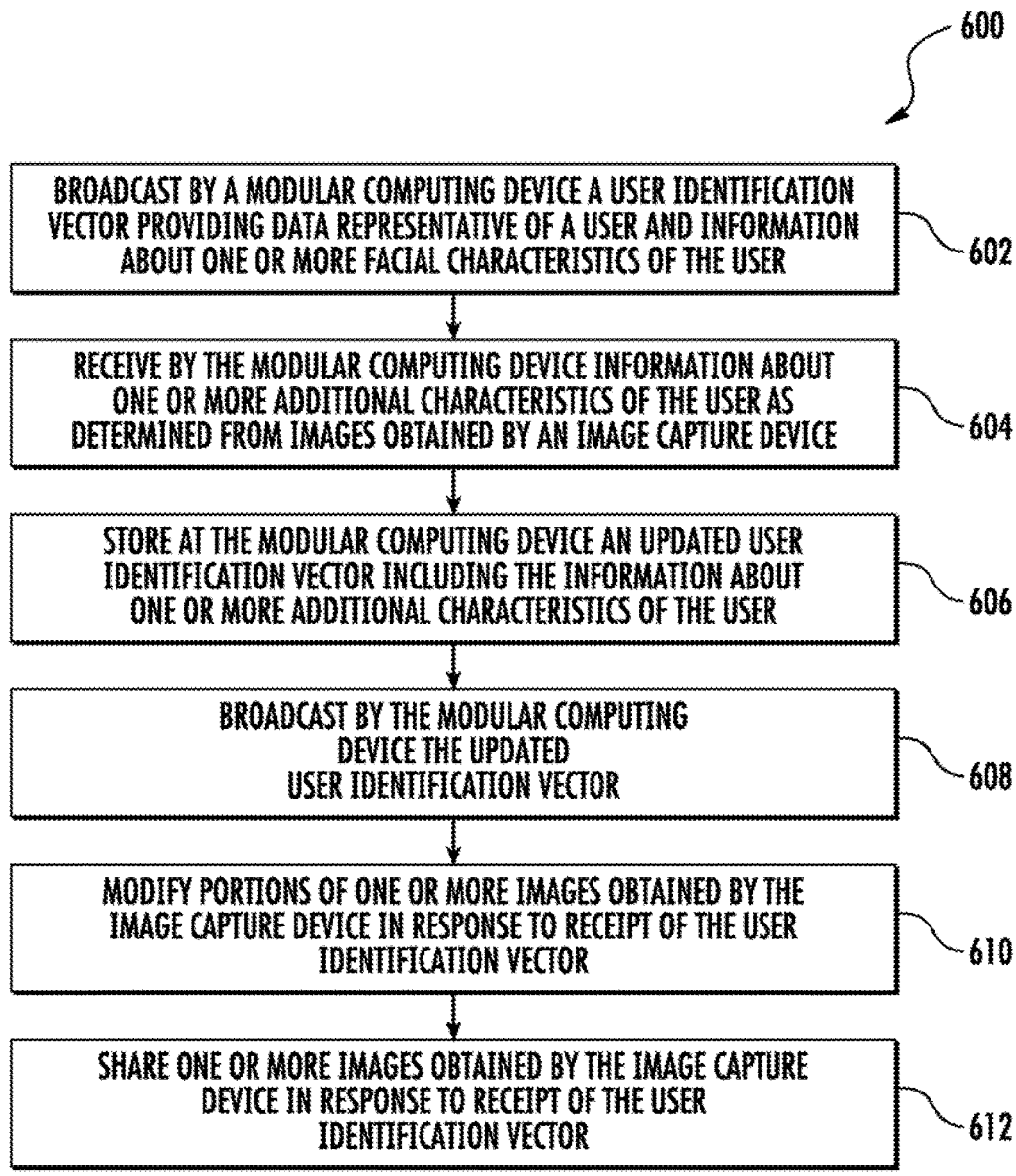
FIG. 6 provides a flow diagram of an example method of updating user identifiers in an image-sharing environment according to example aspects of the present disclosure.

FIG. 6 generally concerns an example computer-implemented method (600) of updating user identifiers in an image-sharing environment. An example image-sharing environment corresponds to one in which modular computing devices and/or image sharing devices are able to communicate user identifiers corresponding with face embeddings and customizable user permission states. A modular computing device can broadcast (602) a user identification vector providing data representative of a user (e.g., user name(s), identification number(s), and/or contact information such as email addresses, phone numbers, and the like) and information about one or more facial characteristics of the user. The basic user identification vector can also include a permission state indicating desired levels of image permission associated with obtained images that capture the user. Permission states can include a privacy request for the user indicating that the user would like to block collection of images that include the user. Permission states can also include sharing requests indicating that the user would like to receive access to images that include the user.

The user identification vector broadcasted at (602) can be received by one or more image capture devices that are in the local area near the modular computing device sending the user identification vector. These image capture devices are able to analyze obtained images to determine if they include the user corresponding with the user identification vector broadcasted at (602). If the user is identified, then images can be modified in accordance with any privacy requests or relayed in accordance with any sharing requests. Images including the user can also be further analyzed to determine additional helpful information that can help further characterize the user and improve the accuracy of subsequent identification of the user in other images. These additional characteristics can include one or more body characteristics of the user (e.g., the current clothes and hairstyle of the user), as well as contextual characteristics of the user (e.g., time, geography, nearby landmarks or people, emotional classifiers, etc.) These additional characteristics of the user are communicated back to the modular computing device, which receives the additional information at (604).

The modular computing device then stores (606) an updated user identification vector 606 that includes data identifying both the original face characteristics of the user as well as an additional characteristics of the user (e.g., body characteristics and/or contextual characteristics) received at (604). The updated user identification vector stored at (606) is then broadcasted by the modular computing device at (608) so that subsequent identification of the user within obtained images can be improved with the additional information included in the updated user identification vector. Additional steps in method (600) can optionally include modifying (610) portions of one or more images obtained by an image capture device in response to receipt of the user identification vector including a privacy request. Additionally or alternatively, a modular computing device can receive (612) one or more images obtained by one or more image capture devices located in proximity to the at least one modular computing device. Receipt (612) can occur when image capture devices share images in response to receipt of a user identification vector including a share request.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the module.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of updating user identifiers in an image-sharing environment, comprising:
    broadcasting, by at least one modular computing device, a user identification vector providing data representative of a user and information about one or more facial characteristics of the user;
    receiving, by the at least one modular computing device, information about one or more additional characteristics of the user, wherein the information about one or more additional characteristics of the user is determined from images of the user obtained by one or more image capture devices;
    storing, by the at least one modular computing device, an updated user identification vector including the information about one or more additional characteristics of the user; and
    broadcasting, by the at least one modular computing device, the updated user identification vector.

2. The computer-implemented method of claim 1, wherein the information about one or more additional characteristics of the user comprises data identifying body characteristics of the user including one or more of a user's current clothes, accessories, body shape, body size, and hair characteristics.

3. The computer-implemented method of claim 1, wherein the information about one or more additional characteristics of the user comprises data identifying current contextual characteristics of the user including one or more of a user's current time, location, emotional state, and companions.

4. The computer-implemented method of claim 1, further comprising receiving, by the at least one modular computing device, one or more images obtained by one or more image capture devices located in proximity to the at least one modular computing devices, wherein the images are received in response to the one or more image capture devices receiving the broadcasted user identification vector.

5. The computer-implemented method of claim 1, wherein the user identification vector includes a privacy request for the user indicating that the user would like to block collection of images that include the user.

6. The computer-implemented method of claim 5, wherein portions of the one or more images corresponding to the user are modified in response to the privacy request.

7. The computer-implemented method of claim 1, wherein the one or more modular computing devices are configured for functional operation in a position relative to the body of the user and wherein the image capture device communicated with by the modular computing device comprises one or more of a smartphone, a laptop, smart watch, and a tablet.

8. A modular computing device, comprising:
    one or more processors; and
    one or more memory devices, the one or more memory devices storing computer-readable instructions that when executed by the one or more processors, cause the one or more processors to perform operations comprising:
    broadcasting a user identification vector providing data representative of a user and information about one or more facial characteristics of the user;
    receiving information about one or more additional characteristics of the user, wherein the information about one or more additional characteristics of the user is determined from images of the user obtained by one or more image capture devices;

storing an updated user identification vector including the information about one or more additional characteristics of the user; and broadcasting the updated user identification vector.

9. The modular computing device of claim 8, wherein the information about one or more additional characteristics of the user comprises data identifying body characteristics of the user including one or more of a user's current clothes, accessories, body shape, body size, and hair characteristics.

10. The modular computing device of claim 8, wherein the information about one or more additional characteristics of the user comprises data identifying current contextual characteristics of the user including one or more of a user's current time, location, emotional state, and companions.

11. The modular computing device of claim 8, wherein the operations further comprise receiving one or more images obtained by one or more image capture devices located in proximity to the modular computing device, wherein the images are received in response to the one or more image capture devices receiving the broadcasted user identification vector.

12. The modular computing device of claim 8, wherein the user identification vector includes a privacy request for the user indicating that the user would like to block collection of images that include the user.

13. The modular computing device of claim 12, wherein portions of the one or more images corresponding to the user are modified in response to the privacy request.

14. The modular computing device of claim 8, wherein the modular computing device is configured for functional operation in a position relative to the body of the user and wherein the image capture device communicated with by the modular computing device comprises one or more of a smartphone, a laptop, smart watch, and a tablet.

15. One or more tangible, non-transitory computer-readable media storing computer-readable instructions that when executed by one or more processors cause the one or more processors to perform operations comprising broadcasting a user identification vector providing data representative of a user and information about one or more facial characteristics of the user;

receiving information about one or more additional characteristics of the user, wherein the information about one or more additional characteristics of the user is determined from images of the user obtained by one or more image capture devices;

storing an updated user identification vector including the information about one or more additional characteristics of the user; and broadcasting the updated user identification vector.

16. The one or more tangible, non-transitory computer-readable media of claim 15, wherein the information about one or more additional characteristics of the user comprises data identifying body characteristics of the user including one or more of a user's current clothes, accessories, body shape, body size, and hair characteristics.

17. The one or more tangible, non-transitory computer-readable media of claim 15, wherein the information about one or more additional characteristics of the user comprises data identifying current contextual characteristics of the user including one or more of a user's current time, location, emotional state, and companions.

18. The one or more tangible, non-transitory computer-readable media of claim 15, wherein the operations further comprise receiving one or more images obtained by one or more image capture devices located in proximity to a modular computing device comprising the one or more tangible, non-transitory computer-readable media, wherein the images are received in response to the one or more image capture devices receiving the broadcasted user identification vector.

19. The one or more tangible, non-transitory computer-readable media of claim 18, wherein the modular computing device is configured for functional operation in a position relative to the body of the user and wherein the image capture device communicated with by the modular computing device comprises one or more of a smartphone, a laptop, smart watch, and a tablet.

20. The one or more tangible, non-transitory computer-readable media of claim 15, wherein the user identification vector includes a privacy request for the user indicating that the user would like to block collection of images that include the user, and wherein portions of the one or more images corresponding to the user are modified in response to the privacy request.

* * * * *